United States Patent
Xuan et al.

(10) Patent No.: US 9,158,791 B2
(45) Date of Patent: Oct. 13, 2015

(54) IMAGE RETRIEVAL AND AUTHENTICATION USING ENHANCED EXPECTATION MAXIMIZATION (EEM)

(75) Inventors: Guorong Xuan, Shanghai (CN); Yun-Qing Shi, Millburn, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 38 days.

(21) Appl. No.: 14/345,211

(22) PCT Filed: Mar. 8, 2012

(86) PCT No.: PCT/US2012/028377
§ 371 (c)(1),
(2), (4) Date: Mar. 14, 2014

(87) PCT Pub. No.: WO2013/133844
PCT Pub. Date: Sep. 12, 2013

(65) Prior Publication Data
US 2014/0355880 A1    Dec. 4, 2014

(51) Int. Cl.
*G06K 9/00* (2006.01)
*G06F 17/30* (2006.01)
*G06K 9/52* (2006.01)
*G06K 9/62* (2006.01)
*G06K 9/46* (2006.01)

(52) U.S. Cl.
CPC .... *G06F 17/30244* (2013.01); *G06F 17/30247* (2013.01); *G06K 9/4642* (2013.01); *G06K 9/527* (2013.01); *G06K 9/6277* (2013.01)

(58) Field of Classification Search
None
See application file for complete search history.

(56) References Cited

U.S. PATENT DOCUMENTS

| | | |
|---|---|---|
| 6,496,834 B1 | 12/2002 | Cereghini et al. |
| 6,519,591 B1 | 2/2003 | Cereghini et al. |
| 6,615,205 B1 | 9/2003 | Cereghini et al. |
| 6,622,117 B2 | 9/2003 | Deligne et al. |
| 6,882,743 B2 | 4/2005 | Bansal et al. |
| 7,194,454 B2 | 3/2007 | Hansen et al. |
| 7,246,048 B2 | 7/2007 | Thiesson et al. |
| 7,313,276 B2 * | 12/2007 | Simelius et al. ............. 382/181 |

(Continued)

FOREIGN PATENT DOCUMENTS

EP     2172874 A1    4/2010

OTHER PUBLICATIONS

Permuter, H. et al—"Gaussian Mixture Models of Texture and Colour for Image Database Retrieval"—Proc. IEEEE Int. Conf. on Acoustics, Speech, and Signal Processing, Apr. 6-10, 2003, vol. 3, pp. 569-572.*

(Continued)

*Primary Examiner* — Andrae S Allison
(74) *Attorney, Agent, or Firm* — Turk IP Law, LLC

(57) ABSTRACT

Technologies are generally presented for employing enhanced expectation maximization (EEM) in image retrieval and authentication. Using uniform distribution as initial condition, the EEM may converge iteratively to a global optimality. If a realization of the uniform distribution is used as the initial condition, the process may also be repeatable. In some examples, a positive perturbation scheme may be used to avoid boundary overflow, often occurring with the conventional EM algorithms. To reduce computation time and resource consumption, a histogram of one dimensional Gaussian Mixture Model (GMM) with two components and wavelet decomposition of an image may be employed.

23 Claims, 8 Drawing Sheets

(56) References Cited

U.S. PATENT DOCUMENTS

| | | | |
|---|---|---|---|
| 7,409,371 B1 | 8/2008 | Heckerman et al. | |
| 7,885,808 B2* | 2/2011 | Goto | 704/207 |
| 8,190,604 B2* | 5/2012 | Wen et al. | 707/732 |
| 8,463,045 B2* | 6/2013 | Yang et al. | 382/190 |
| 8,503,792 B2* | 8/2013 | Zhang et al. | 382/195 |
| 8,744,180 B2* | 6/2014 | Atsmon et al. | 382/165 |
| 2002/0129038 A1 | 9/2002 | Cunningham | |
| 2003/0101187 A1 | 5/2003 | Gaussier et al. | |
| 2004/0210400 A1 | 10/2004 | Konvicka | |
| 2005/0089906 A1 | 4/2005 | Furuta et al. | |
| 2006/0020597 A1* | 1/2006 | Keating et al. | 707/6 |
| 2007/0294241 A1 | 12/2007 | Surendran et al. | |
| 2008/0059149 A1 | 3/2008 | Martin | |
| 2008/0240572 A1* | 10/2008 | Hoshii | 382/190 |
| 2008/0259163 A1 | 10/2008 | Yu et al. | |
| 2008/0267304 A1 | 10/2008 | Chong et al. | |
| 2009/0052565 A1 | 2/2009 | Lo et al. | |
| 2009/0163168 A1 | 6/2009 | Andersen et al. | |
| 2009/0296594 A1 | 12/2009 | Cao et al. | |
| 2010/0070521 A1 | 3/2010 | Clinchant et al. | |
| 2010/0226527 A1 | 9/2010 | Zhang et al. | |
| 2011/0026831 A1* | 2/2011 | Perronnin et al. | 382/197 |
| 2011/0050396 A1 | 3/2011 | Chaves | |
| 2012/0163715 A1* | 6/2012 | Murray et al. | 382/167 |
| 2012/0166472 A1* | 6/2012 | Hoppenot et al. | 707/769 |
| 2014/0029839 A1* | 1/2014 | Mensink et al. | 382/159 |

OTHER PUBLICATIONS

Permuter, H. et al.—"Supervised Joint Segmentation and Classification of Colored Textured Images Using Gaussian Mixture Models"—MOUMIR Multimedia Content Retrieval Conf., Mar. 11-12, London, England, pp. 1-26.*

International Preliminary Report on Patentability for PCT/US2012/028377 filed Mar. 8, 2012, mailed on Sep. 18, 2014, issued Sep. 9, 2014.

International Search Report and Written Opinion for PCT/US12/28377, filed Mar. 8, 2012, mailed on Feb. 21, 2013.

Pernkopf et al., "Genetic-Based EM Algorithm for Learning Gaussian Mixture Models", IEEE Transaction on Pattern Analysis and Machine Intelligence, vol. 27, No. 8, Aug. 2005.

Bilmes, "A Gente Tuoral of he EM Algorithm and its Application to Parameter Estmaton for Gaussan Mixture and Hidden Markov Models", Apr. 1998.

Dempster et al., "Maximum Likelihood from Incomplete Data via the EM Algorithm", Journal of the Royal Statistical Society 39 (B), pp. 1-38, vol. 39, No. 1, 1977.

Du et al., "Lossless Authentication of MPEG-2 Video", Proceedings of IEEE Conference of Image Processing, pp. 893-896, vol. 2, Sep. 2002.

Figueiredo et al., "Unsupervised Learning of Finite Mixture Models", IEEE Transactions on Pattern Analysis and Machine Intelligence, vol. 24, No. 3 pp. 381-396, Mar. 2002.

Fridrich et al., "Invertible Authentication Watermark for JPEG Images", International Conference on Information Technology (ITCC '01), pp. 223-227, Apr. 2-4, 2001.

Fukunaga et al., "Introduction to Statistical Pattern Recognition-2nd" Elsevier Academic Press, pp. 528-532, Sep. 1990.

He et al., "Applying the Extended Mass-Constraint EM Algorithm to Image Retrieval", Computers & Mathematics with Applications, vol. 56, Issue 4, pp. 1010-1024, Aug. 2008.

Li et al., "Automatic Linguistic Indexing of Pictures by a Statistical Modeling Approach", IEEE Transactions on Pattern Analysis and Machine Intelligence, vol. 25, No. 9, pp. 1075-1088, Sep. 2003.

Ni et al., "Robust Lossless Image Data Hiding Desioned for Semi-Fragile Image Authentication", IEEE Transactions on Circuits and Systems for Video Technology, vol. 18, No. 4, pp. 497-509, Apr. 2008.

Rose et al., "Deterministic: Annealing for Clustering, Compression, Classification, Regression, and Related Opation Problems", Proceedings of the IEEE, vol. 86, No. 11, Nov. 1998.

Verbeek et al., "Efficient Gmedy Learning of Gaussian Mixture Models", Neural Computation, vol. 15, Issue. 2, PP. 469-485, Feb. 2003.

Vlassis et al., "A Greedy EM Algorithm for Gaussian Mixture Learning". Neural Processing Letters, vol. 15, Issue 1, pp. 77-87, Feb. 2002.

Xuan et al., "EM Algorithm of Gaussian Mixture Model and Hidden Markov Model", IEEE International Conference on Image Processing (ICIP 2001), vol. 1, pp. 145-148, Oct. 2001.

Xuan et al., "A Novel Bayesian Classifier with Smaller Eigenvalues Reset by Threshold Based on Database", International Conference on Image Analysis and Recognition (ICIAR07), Aug. 2007.

Xuan et al., "Reversible Data Hiding for JPEG Images Based on Histogram Pairs", International Conference on Image Analysis and Recognition (ICIAR07), pp. 715-727, Aug. 2007.

Xuan et al., "Optimum Histogram Pair Based Image Lossless Data Embedding", International Workshop on Digital Watermarking (IWDW07), pp. 264-278. Dec. 2007.

Xuan et al., "Optimum Histogram Pair Based Image Lossless Data Hiding", Transaction on Data Hiding and Multimedia Security IV, LNCS5510, pp. 84-102, 2009.

Zou et al., "A Semi-Fragile Digital Watermarking Scheme Based on Integer Wavelet Transform", IEEE Transactions on Circuits and Systems for Video Technology, vol. 16, No. 10, pp. 1294-1300, Oct. 2006.

Zhang et al., "A Unified Authentication Framework for JPEG2000 Images", IEEE International Conference and Expo (ICME04), pp. 915-918, vol. 2, Jun. 2004.

"The Database of Faces," accessed at http://web.archive.org/web/20120305221121/http://www.cl.cam.ac.uk/research/dtg/attarchive/facedatabase.html, accessed on Jan. 7, 2015, p. 1.

* cited by examiner

COMPUTER PROGRAM PRODUCT 700

SIGNAL-BEARING MEDIUM 702

704 AT LEAST ONE OF

ONE OR MORE INSTRUCTIONS FOR USING REALIZATION OF UNIFORM DISTRIBUTION IN INITIALIZATION OF EEM ALGORITHM ON RECEIVED DATA TO PREVENT CONVERGENCE TO A LOCAL MAXIMUM;
    ONE OR MORE INSTRUCTIONS FOR USING POSITIVE PERTURBATION SCHEME TO AVOID BOUNDARY OVERFLOW;
    ONE OR MORE INSTRUCTIONS FOR GENERATING SIGNATURE VECTOR FOR THE ANALYZED DATA; AND
    ONE OR MORE INSTRUCTIONS FOR USING THE SIGNATURE VECTOR TO DETERMINE UNIQUENESS OR SIMILARITY OF THE ANALYZED DATA TO OTHER DATA.

| COMPUTER-READABLE MEDIUM 706 | RECORDABLE MEDIUM 708 | COMMUNICATIONS MEDIUM 710 |
|---|---|---|

FIG. 7

IMAGE RETRIEVAL AND AUTHENTICATION USING ENHANCED EXPECTATION MAXIMIZATION (EEM)

CROSS-REFERENCE TO RELATE APPLICATION

This Application is the National Stage filing under 35 U.S.C §371 of PCT Application Ser. No. PCT/US12/28377 filed on Mar. 8, 2012. The disclosure of the PCT Application is hereby incorporated by reference in its entirety.

BACKGROUND

Unless otherwise indicated herein, the materials described in this section are not prior art to the claims in this application and are not admitted to be prior art by inclusion in this section.

With the proliferation of networking and data storage technologies, search and retrieval operations are becoming increasingly complex and sought after. Search and retrieval of images is a substantially different process than search for textual data. In searching for images, commonly similarity is used in obtaining results. A contrasting process involving images is authentication, where uniqueness of an image may be attempted to be proven.

One of the approaches employed in image authentication and/or similarity determination is the expectation maximization (EM) technique, which is an iterative process to compute the Maximum Likelihood (ML) estimate in the presence of missing or hidden data. In ML estimation, model parameters are attempted to be estimated for which the observed data are the most likely. Each iteration of the EM technique may include two processes: The E-step, and the M-step. In the expectation, or E-step, the missing data may be estimated given the observed data and current estimate of the model parameters. This may be achieved using conditional expectation. In the M-step, the likelihood function may be maximized under the assumption that the missing data are known. The estimate of the missing data from the E-step may be used in lieu of the actual missing data. Convergence may be assured since the technique is guaranteed to increase the likelihood at each iteration.

Employing the EM technique in image retrieval and authentication has several shortcomings. For example, the EM technique may converge to a local maximum, whereas image data may include multiple local maxima. The EM technique may also suffer from a singularity when the denominator is zero or substantially close to zero. Moreover, a computation time may be undesirably long before convergence and a number of Gaussian models to be used in the technique may be hard to determine.

SUMMARY

The present disclosure generally describes technologies for employing an EEM technique in image retrieval and authentication.

According to some example embodiments, a method for employing an Enhanced Expectation Maximization (EEM) to determine data uniqueness and similarity may include receiving data to be analyzed; employing a realization of uniform distribution in an initialization of the EEM on the received data to prevent convergence to a local maximum; employing a positive perturbation scheme to avoid boundary overflow; generating a signature vector for the analyzed data; and employing the signature vector to determine one of uniqueness and similarity of the analyzed data to other data based on a similarity of the signature vector to signature vectors of the other data.

According to other example embodiments, a computing device for employing an Enhanced Expectation Maximization (EEM) to determine data uniqueness and similarity may include a memory configured to store instructions and a processor coupled to the memory and configured to execute a data processing application in conjunction with the instructions stored in the memory. The data processing application may receive data to be analyzed; employ a realization of uniform distribution in an initialization of the EEM on the received data to prevent convergence to a local maximum; employ a positive perturbation scheme to avoid boundary overflow; generate a signature vector for the analyzed data; and employ the signature vector to determine one of uniqueness and similarity of the analyzed data to other data based on a similarity of the signature vector to signature vectors of the other data.

According to further example embodiments, a computer-readable storage medium may have instructions stored thereon for employing an Enhanced Expectation Maximization (EEM) to determine data uniqueness and similarity. The instructions may include receiving data to be analyzed; employing a realization of uniform distribution in an initialization of the EEM on the received data to prevent convergence to a local maximum; employing a positive perturbation scheme to avoid boundary overflow; generating a signature vector for the analyzed data; and employing the signature vector to determine one of uniqueness and similarity of the analyzed data to other data based on a similarity of the signature vector to signature vectors of the other data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 illustrates a block diagram of an example computer program product, all arranged in accordance with at least some embodiments described herein.

DETAILED DESCRIPTION

Figure 1:
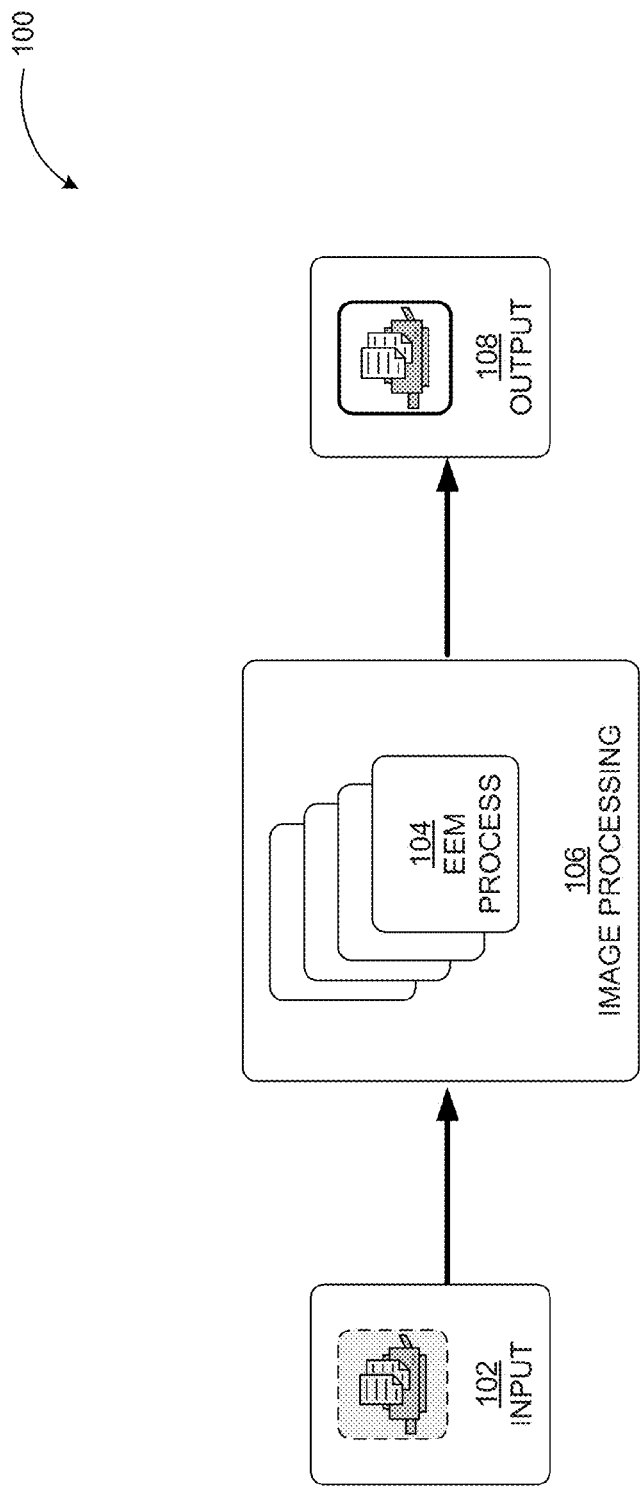
FIG. 1 illustrates an example system, where an EEM technique may be employed for image retrieval and authentication.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to employing an EEM technique in image retrieval and authentication.

Briefly stated, technologies are presented for employing enhanced expectation maximization (EEM) in image retrieval and authentication. Using uniform distribution as an initial condition, the EEM may converge iteratively to a global optimality. If a realization of the uniform distribution is used as the initial condition, the process may also be repeatable. In some examples, a positive perturbation scheme may be used to avoid boundary overflow, often occurring with conventional EM algorithms. To reduce computation time and resource consumption, a histogram of one dimensional Gaussian Mixture Model (GMM) with two components and wavelet decomposition of an image may be employed.

FIG. 1 illustrates an example system, where an EEM technique may be employed for image retrieval and authentication, arranged in accordance with at least some embodiments described herein.

As shown in a diagram 100 of FIG. 1, an Enhanced Expectation Maximization (EEM) may be employed to determine data uniqueness or similarity by an application such as an image processing application 106. The data whose uniqueness or similarity is determined may not be limited to image data, but other data such as audio, video, or even textual data may be processed using the principles described herein. In an example scenario, the data to be analyzed may be received through an input mechanism 102 such as an input device, a data store, and so on. The received data may be subjected to an iterative EEM process 104 by the image processing application 106 and an output 108 such as a binary decision (e.g., "yes" or "no"), a likelihood of similarity or uniqueness, or another metric result may be provided.

The iterative EEM process 104 may employ a realization of uniform distribution in an initialization of the EEM on the received data to prevent convergence to a local maximum, a positive perturbation scheme to avoid boundary overflow, and generate a signature vector for the analyzed data. The signature vector may be used to determine uniqueness or similarity of the analyzed data to other data based on a similarity of the signature vector to signature vectors of the other data.

Figure 2A:
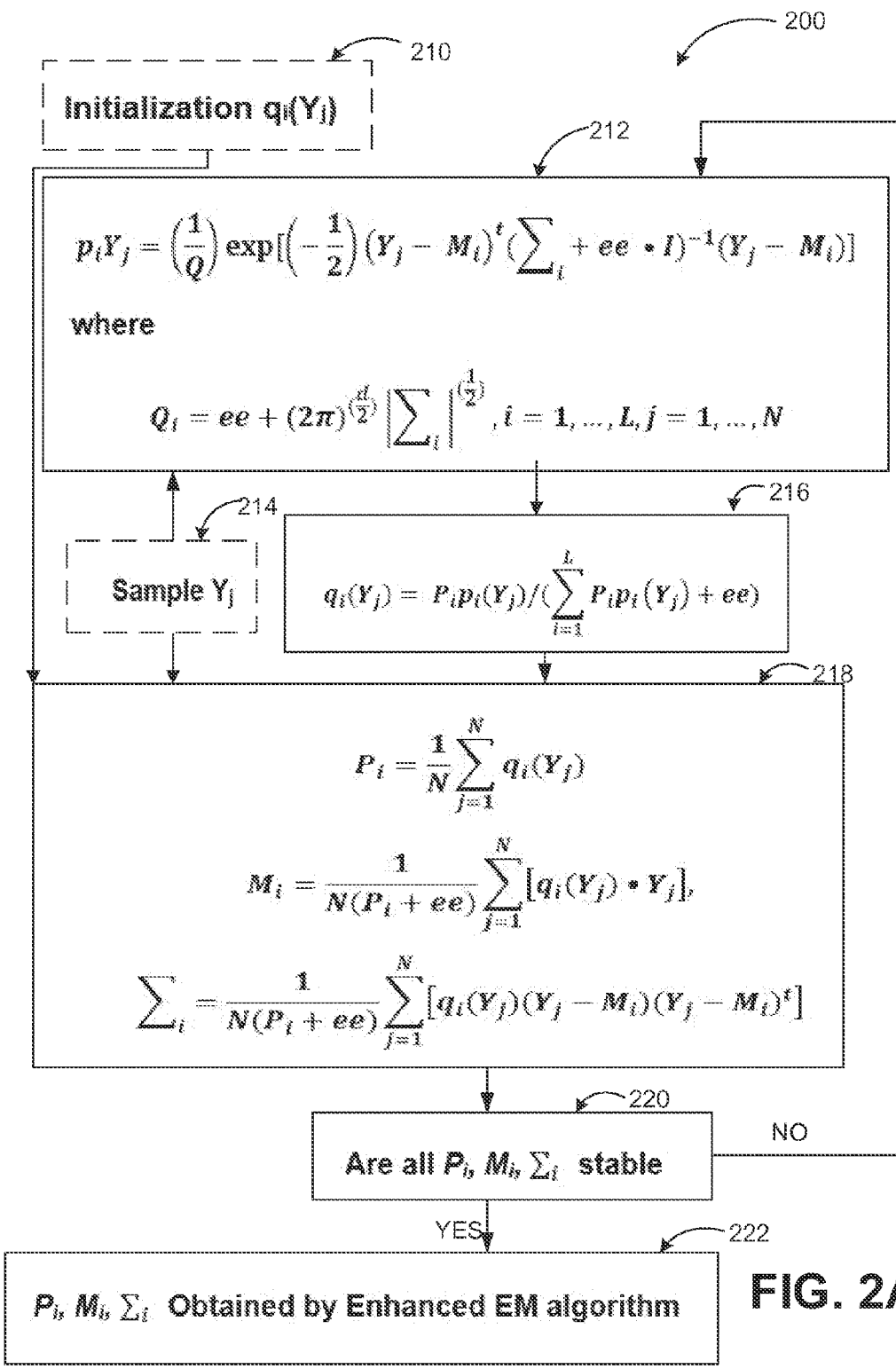
FIG. 2A illustrates a flow diagram of an example EEM technique using samples.

FIG. 2A illustrates a flow diagram of an example EEM technique using samples, arranged in accordance with at least some embodiments described herein.

While EM technique is commonly used in similarity or uniqueness determination, the EM technique and its various improved versions still remain generally complicated and may encounter calculation challenges. For example, the EM technique may converge to a local maximum or may include a singularity when the denominator is zero or very close to zero. The technique may also take a long time before convergence, and a number of components of Gaussian models to be used may be difficult to determine.

In data retrieval and authentication, particularly image data, two characteristics of an Enhanced Expectation Maximization (EEM) may be used as features. The characteristics are uniqueness and similarity. The uniqueness may be determined by the features (or feature vectors) being different for different images. The similarity may be determined by the feature vectors of similar images being similar or close to each other in feature vector space. In comparison, other approaches such as a hash function may satisfy the uniqueness requirement, but cannot satisfy the similarity requirement. Thus, an EEM technique according to some embodiments described herein provides a mechanism for determining uniqueness as well as similarity in one approach while not having local maximum convergence, singularity, or computation time challenges.

As depicted in FIG. 2, a diagram 200 includes an initialization computation 210. By using a realization of uniform distribution, local optima may be avoided, enabling the EEM to converge to a global maximum. The uniform distribution may be of maximum entropy among various distributions. A priori conditional Probability Mass Function (PMF) of a sample vector 214 may be computed in a computation 212 based on a partition function Q and a mean vector. A small positivity quantity ee may be added at the computation 212. The addition of the small positivity quantity (e.g., ee=$10^{-20}$) in the denominator (in a computation 216) may be referred to as a Positive Perturbation Scheme. In the computation of matrix inverse at the computation 216, the computation may not have to stop because of division by zero (singularity), guaranteeing reliable computation.

Referring back to the computation 212, the partition function Q for each vector may also be defined at this operation. Following the computation 212, the sample vector 214 may be introduced to a computation 218 along with the posteriori PMF of the sample vector 214 computed at the computation 216 and the weight coefficients from the initialization computation 210. At the computation 218, the priori probability of the sample vector(s) 214, the mean vector(s), and the covariance matrix may be computed. As discussed above, having the small positivity quantity ee in the denominator may prevent singularity. The sample vector 214 based EEM may continue with a decision operation 220, where the priori probability of the sample vector(s) 214, the mean vector(s), and the covariance matrix may be tested for stability. If either entity is not stable, the computation may iterate through the computation 212 again. If stability is determined, the priori probability of the sample vector(s) 214, the mean vector(s), and the covariance matrix may be obtained for signature vector comparison and similarity/uniqueness determination at a computation 222.

Figure 2B:
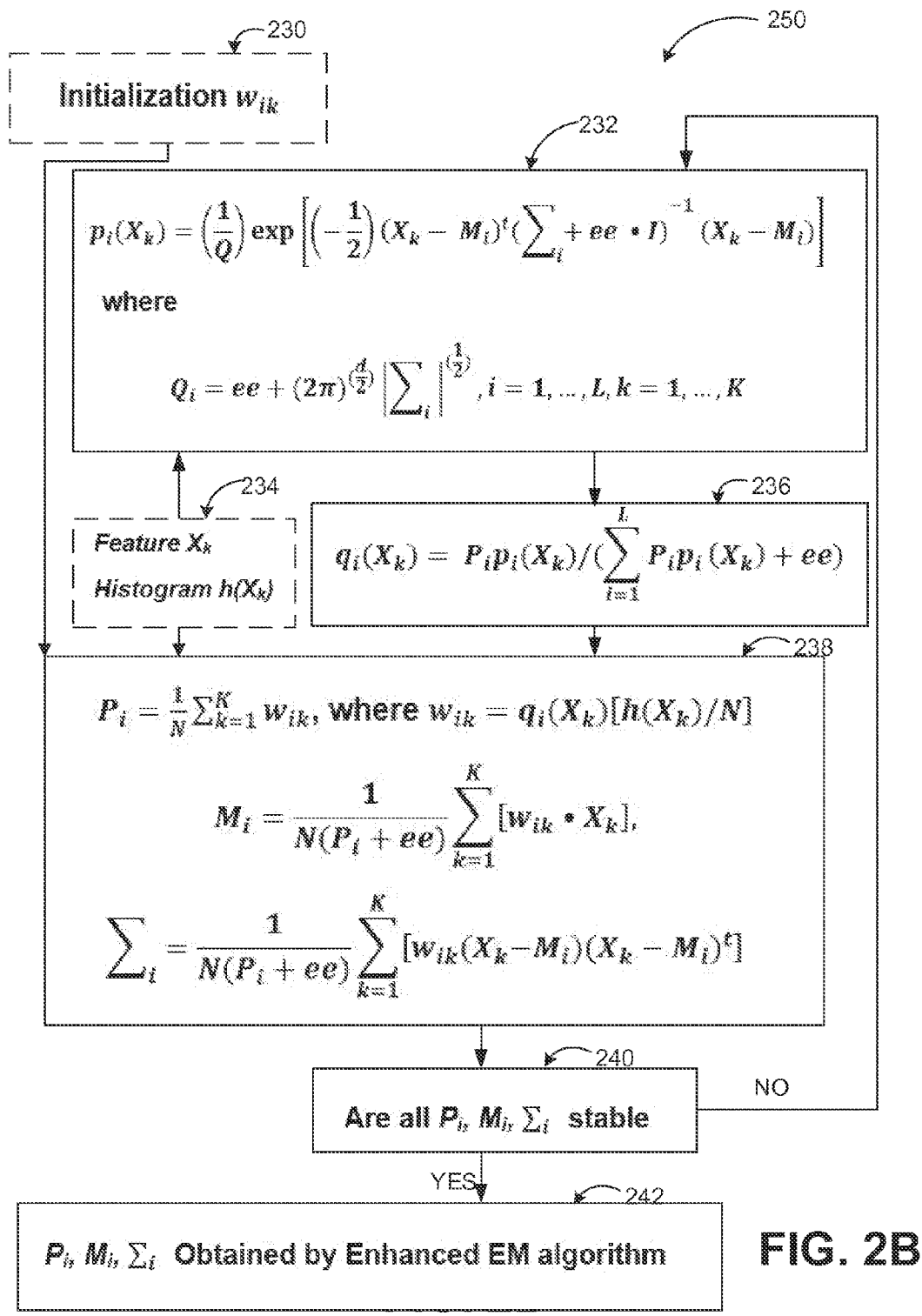
FIG. 2B illustrates a flow diagram of an example EEM technique using a histogram.

In the computations of the diagram 200, following parameters and definitions are used:

L: number of Gaussian PMF, i=1, ..., L,
N: number of Samples (Pixels), j=1, ..., N,
$Y_j$ 214: sample vector, K: number of Features (Gray levels), k=1, ..., K,
$P_i$: Priori probability i Pr,
$M_i$: Mean Vector i,
$\Sigma i$: Covariance matrix,
$w_{ik}$: Weight coefficient ik,
$X_k$: Feature vector of sample vector $Y_j$,
$h(X_k)$: Histogram with feature $X_k$,
$q_i(X_k)$: Posteriori PMF for $X_k$,
$p_i(X_k)$: Conditional PMF,
$Q_i$: partition function
$q_i(Y_j)$: Posteriori PMF for $Y_j$
$p_i(Y_j)$: Priori probability I Pr of sample vector FIG. 2B illustrates a flow diagram of an example EEM technique using a histogram, arranged in accordance with at least some embodiments described herein.

In a system an EEM technique according to some embodiments, the computation time may be reduced by working on image histograms instead of on image samples simplifying the computation substantially. In some examples, the histogram of one dimensional Gaussian Mixture Model (GMM) with two components of Gaussian models as well as multi-level wavelet decomposition of the analyzed images may be used to further optimize the computation. The multilevel wavelet decomposition may involve additional parameters. However, use of two Gaussian components may be sufficient because the histogram of wavelet high-frequency $\text{sub}_a$-band is known to obey the general Laplacian distribution of zero mean.

As shown in FIG. 2A, a diagram 250 illustrates computations 230, 232, 236, 238, and 242 similar to those in the diagram 200 of FIG. 2A. The parameters and definitions listed above are also used in the computations of the diagram 250. The conditional PMF and the partition function Q for each vector may be determined at the computation 232. Feature vectors $X_i$ and histograms $h(X_k)$ may be provided (234) for the computations 232 and 238 in place of sample vectors according to the process described in the diagram 250. The posteriori PMF of the feature vector computed at the computation 236, the feature vectors $X_i$ and histograms $h(X_k)$, and the weight coefficients from the initialization 230 may be employed at the computation 238 to determine the priori probability of the feature vector(s), the mean vector(s), and the covariance matrix. At decision operation 240, a determination may be made whether results of the computation 238 are stable. If the results are determined to be stable, the probability of the feature vector(s), the mean vector(s), and the covariance matrix may be declared as the results of the EEM computation at computation 242. If the results are not stable yet, the process may be iterated returning to computation 232.

To determine the number of Gaussian models needed to be used for a given image, multilevel discrete wavelet transforms may be applied according to some examples (e.g., five-level wavelet transform). The high-frequency wavelet sub-bands obey generalized Laplacian distribution, which is centered at zero. Thus, a small number of Gaussian distributions may be used for each sub-band in order to simplify the computation and achieve stability and efficiency. For example, two Gaussian distributions may be sufficient for some example implementations.

Additionally, by using wavelet transform, one dimensional Gaussian distribution may be employed instead of two or three dimensional Gaussian distributions further simplifying the EEM. Some example wavelet transforms that may be used include CDF (2, 2) wavelet transform or Haar wavelet transform. Of course, other transforms may also be employed. In image space, the described EEM technique may be applied to monochrome images or color components such as HSV, YCrCb, CMYK, or RGB.

Some of the symbols used in FIG. 2A and FIG. 2B and parameters selected for those computations are shown in table 1 below.

TABLE 2

Symbols and meanings

| Symbols | Meanings |
|---------|----------|
| GMM | Gaussian Mixture Model used here: $p_{GMM} = P_1 \times N(\mu_1, \sigma_1^2) + P_2 \times N(\mu_2, \sigma_2^2)$ |
| r/100 | Number of iteration: r |
| $P_1$ | Priori probability 1 (for Gaussian component 1) |
| $\mu_1$ | mean 1 |
| $\sigma_1^2$ | variance 1 |
| $P_2$ | Priori probability 2 (for component 2, $P_2 = 1 - P_1$) |
| $\mu_2$ | mean 2 |
| $\sigma_2^2$ | variance 2 |
| Jmax/1000 | Likelihood: Jmax = sum(h * $\log_{10}(p)$), $J = \log_{10}(\pi_x(p(x))^{hx}) = \Sigma_x h_x \log_{10}(p(x))$ |
| G(dB) | Goodness of fitting $G = 10 * \log_{10}(ee + A/(ee + MSE))$; where: $A = (\max(\max(h_{EM}), \max(h)))^2$; $MSE = \text{sum}((h_{EM} - h)^2)/M$; (h is original histogram, and $h_{EM}$ is histogram by EM) $$G = 10\log_{10}\frac{[\max\{\max(h_{korg}), \max(h_{kEM})\}]^2}{\frac{1}{256}\sum_{k=0}^{255}(h_{korg} - h_{kEM})^2}$$ |
| T(second) | Time consumed in operation |

Figure 3:
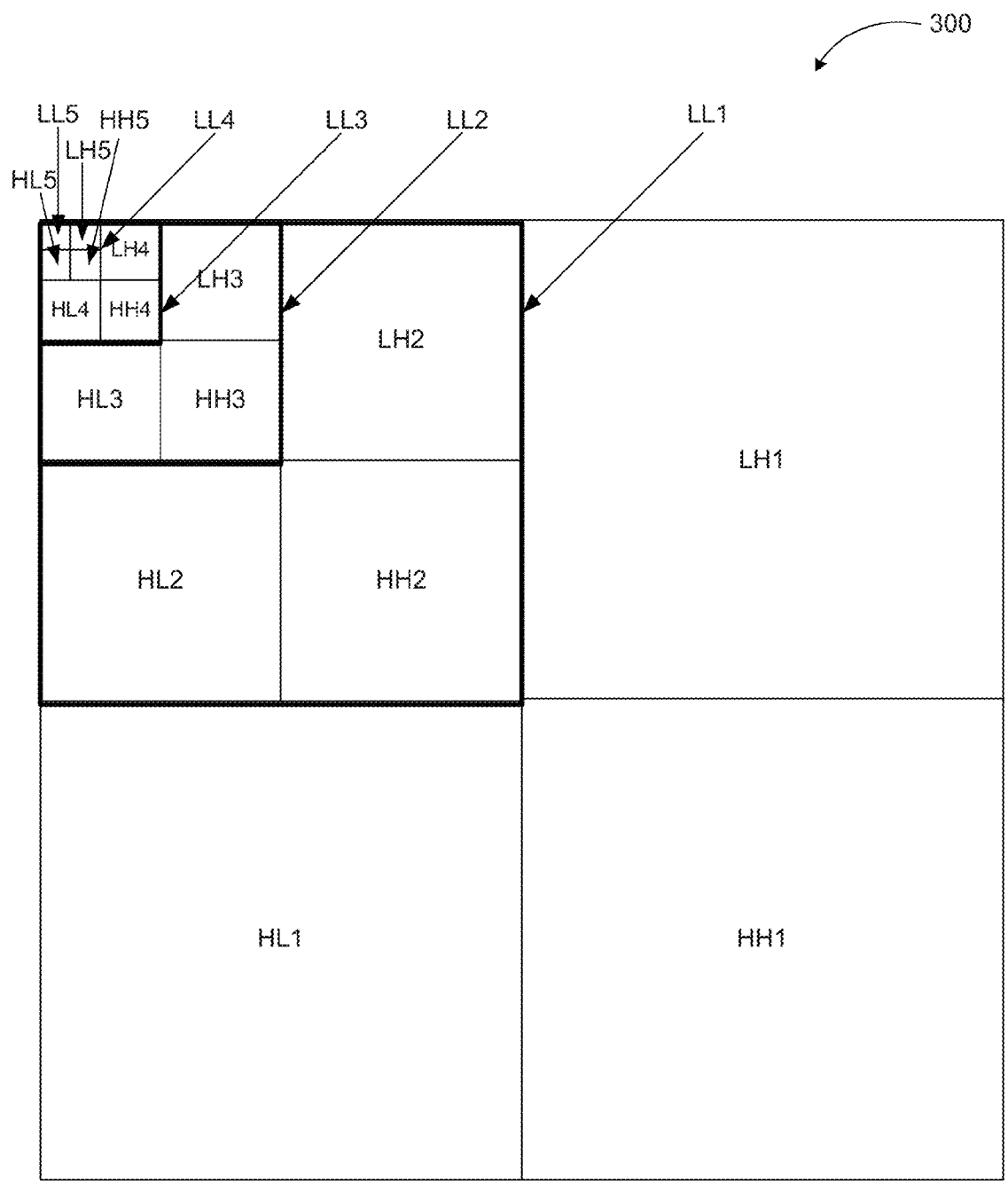
FIG. 3 illustrates an example five-level wavelet transform to be used in an EEM technique.

FIG. 3 illustrates an example five-level wavelet transform to be used in an EEM technique, arranged in accordance with at least some embodiments described herein.

To address the challenge of determining how many Gaussian models should be used, multi-level discrete wavelet transforms may be applied for a given image (or data set). In some example implementations, five-level wavelet transform as shown in a diagram 300 may be employed. The diagram 300 shows how an image may be divided into four segments (HH1 HL1, LH1, LL1), then one of the segments further divided (HH2, HL2, LH2, LL2), and so on until level five (HH5, HL5, LH5, LL5) is reached. The high-frequency sub-bands obey generalized Laplacian distribution, which is centered at zero. Consequently, a small number of Gaussian distributions may be used for each sub-band in order to simplify the computation and make the computation steady and efficient. For example, in a system employing five-level wavelet transform, two Gaussian distributions may be sufficient.

Furthermore, through the utilization of wavelet transform 1-D Gaussian distribution may be used instead of 2-D or 3-D Gaussian distribution further simplifying EEM computation. One example wavelet transform that may be employed is Haar wavelet transform. In some embodiments, parameters such as mean and variance of GMM used to model image wavelet sub-bands may be selected to serve as signature of an image.

The marriage of multi-level wavelet decomposition and effective EEM technique of GMM learning can provide a platform, on which many statistical parameters are usable. Such a platform with rich information and flexibility may make it possible to use low-level processing for high-level processing. Uniqueness and similarity properties of the signature derived from some parameters of GMM may play a substantial role in image retrieval/indexing, image authentication, as well as multimedia data retrieval, indexing, authentication, and forensics.

Figure 4:
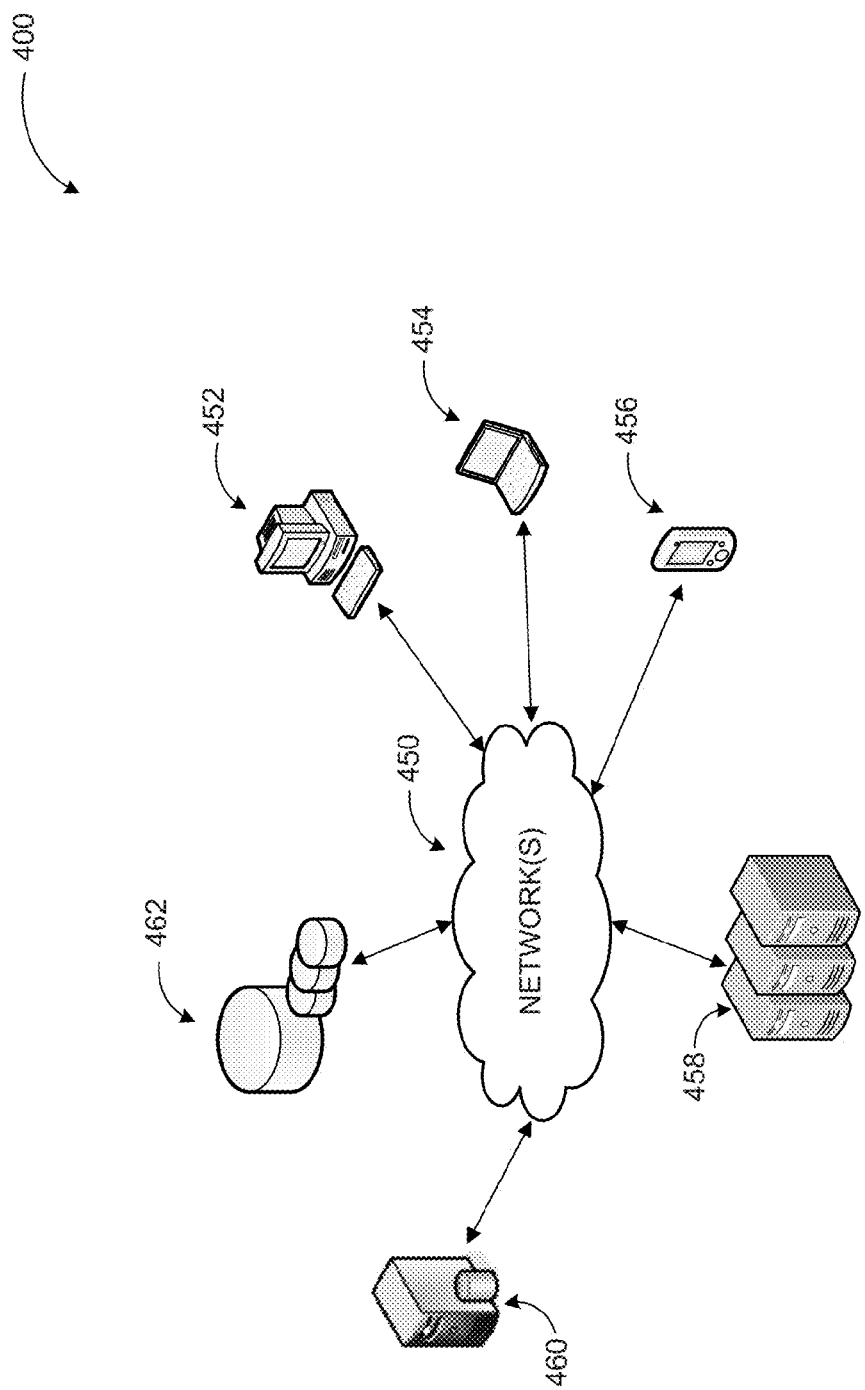
FIG. 4 illustrates an example networked system for employing an EEM technique in image retrieval and authentication.

FIG. 4 illustrates an example networked system for employing an EEM technique in image retrieval and authentication, arranged in accordance with at least some embodiments described herein. While example embodiments are discussed in image retrieval and authentication, an EEM according to embodiments may be employed in a number of other areas as well. Audio, video, or other forms of data retrieval and authentication are some illustrative examples.

An application employing an EEM technique in image retrieval and authentication may be a locally installed application or software executed over one or more servers such as a hosted service. As shown in a diagram 400, an example hosted service or a cloud based application performing image retrieval and authentication may be executed on servers 458 and communicate with client applications on individual computing devices such as a smart phone 456, a laptop computer 454, or a desktop computer 452 ('client devices') through network(s) 450.

Client applications such as browsers or other applications executed on any of the client devices 452-456 may facilitate communications with application(s) executed on the servers 458. The hosted service may use a realization of uniform distribution in initialization of EEM algorithm on received data to prevent convergence to a local maximum, use a positive perturbation scheme to avoid boundary overflow, generate a signature vector for the analyzed data, and use the signature vector to determine uniqueness or similarity of the analyzed data to other data. The hosted service may retrieve relevant data (e.g., image data) from data store(s) 462 directly or through a database server 460, and provide results to the user(s) through the client devices 452-456.

Network(s) 460 may comprise any topology of servers, clients, Internet service providers, and communication media. A system according to embodiments may have a static or dynamic topology. Network(s) 460 may include secure networks such as an enterprise network, an unsecure network such as a wireless open network, or the Internet. Network(s) 460 may also coordinate communication over other networks such as Public Switched Telephone Network (PSTN) or cellular networks. Furthermore, the network(s) 460 may include short range wireless networks such as Bluetooth or similar ones. The network(s) 460 provide communication between the nodes described herein. By way of example, and not limitation, the network(s) 460 may include wireless media such as acoustic, RF, infrared or other wireless media.

Many other configurations of computing devices, applications, data sources, and data distribution systems may be employed to implement a hosted service for employing an EEM technique in image retrieval and authentication. Furthermore, the networked environments discussed in FIG. 4 are for illustration purposes only. Embodiments are not limited to the example applications, modules, or processes.

While example embodiments are described using specific formulas, parameters, and computations, embodiments are not limited to those. Example implementations may also employ other formulas, parameters, computations, and so on using the principles described herein.

Figure 5:
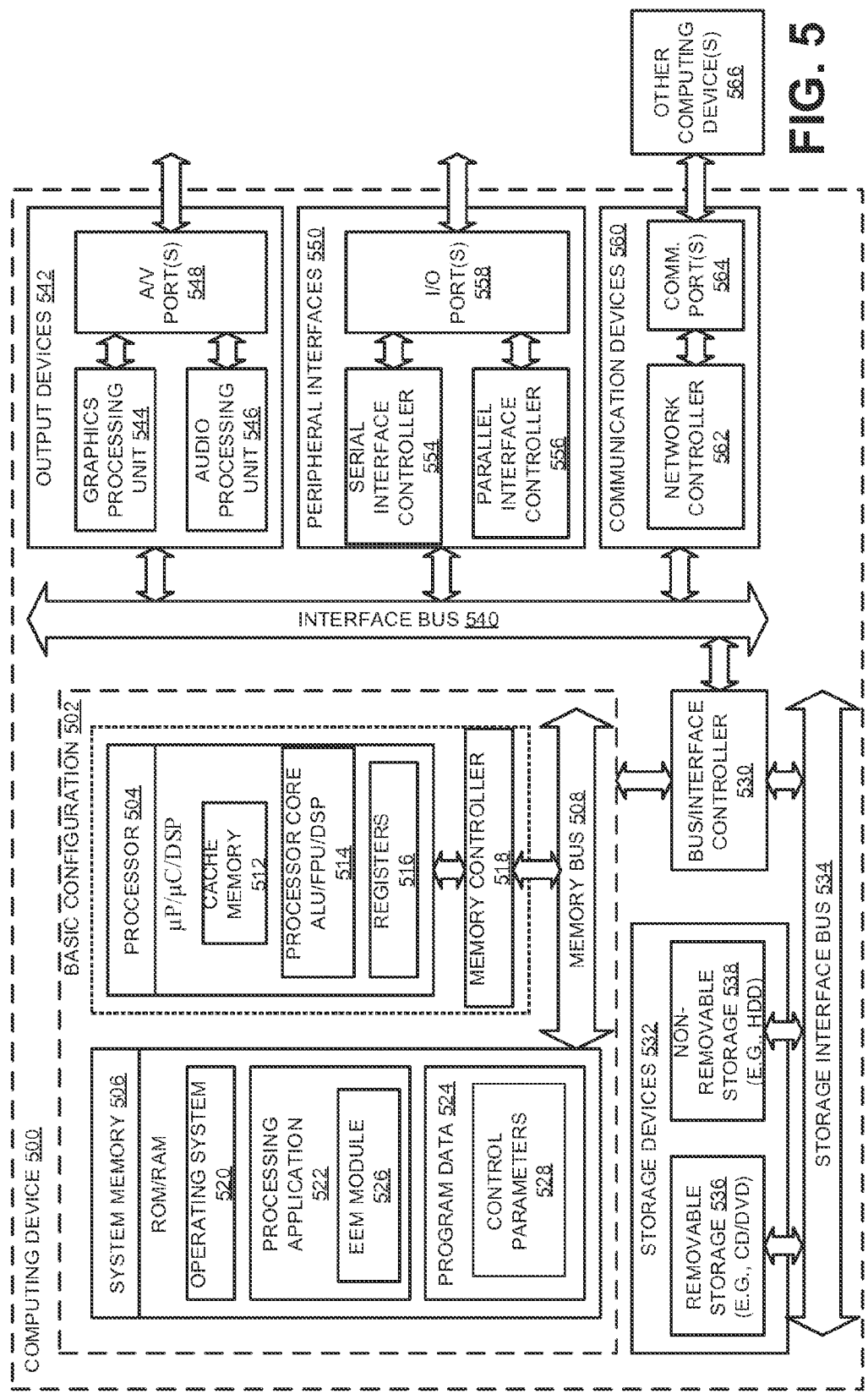
FIG. 5 illustrates a general purpose computing device, which may be used to employ an EEM technique in image retrieval and authentication.

FIG. 5 illustrates a general purpose computing device 500, which may be used to employ an EEM technique in image retrieval and authentication, arranged in accordance with at least some embodiments described herein. For example, the computing device 500 may be used as servers 458 of FIG. 4. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications 522, and program data 524. The applications 522 may include an image processing application, an image retrieval application, a search engine and similar ones, and employ an EEM module 526, which may employ an EEM technique in image retrieval and authentication as described herein. The program data 524 may include, among other data, control parameters 528, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disc drives such as compact disc (CD) drives or digital versatile disc (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile discs (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 550, and one or more communication devices 560) to the basic configuration 502 via the bus/interface controller 530. Some of the example output devices 542 include a graphics processing unit 544 and an audio processing unit 546, which may be configured to communicate to various external devices such as a display or speakers via one or more A/V ports 548. One or more example peripheral interfaces 550 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 560 includes a network controller 562, which may be arranged to facilitate communications with one or more other computing devices 566 over a network communication link via one or more communication ports 564. The one or more other computing devices 566 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for maintaining application performances upon transfer between cloud servers. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 6:
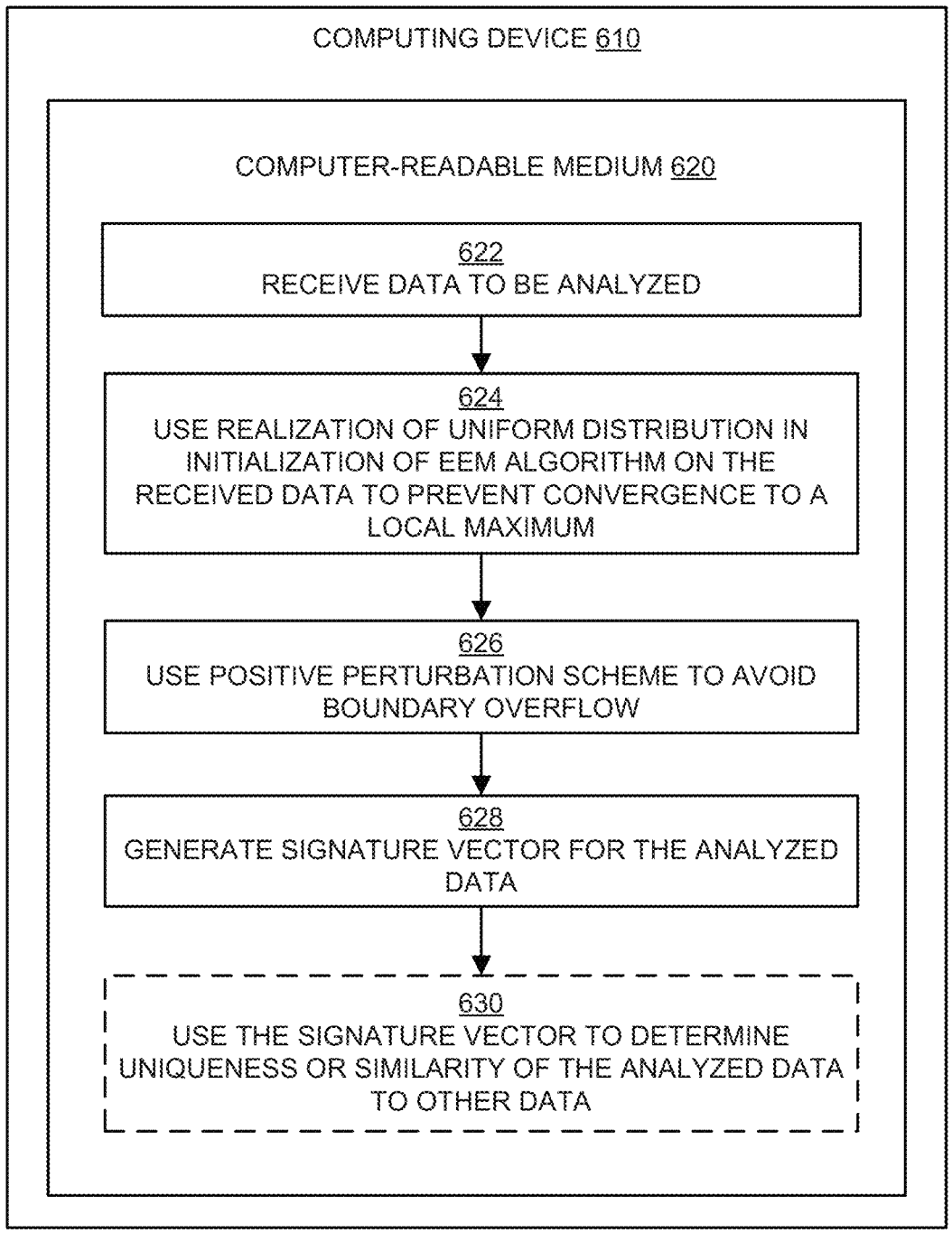
FIG. 6 is a flow diagram illustrating an example method that may be performed by a computing device such as the device in FIG. 5.

FIG. 6 is a flow diagram illustrating an example method that may be performed by a computing device such as the device 500 in FIG. 5, arranged in accordance with at least some embodiments described herein. Example methods may include one or more operations, functions or actions as illustrated by one or more of blocks 622, 624, 626, 628, and/or 630. The operations described in the blocks 622 through 630 may also be stored as computer-executable instructions in a computer-readable medium such as a computer-readable medium 620 of a computing device 610.

An example process for employing an EEM technique in image retrieval and authentication may begin with block 622, "RECEIVE DATA TO BE ANALYZED", where data to be analyzed using the EEM technique may be received at a computation application or module such as the EEM module 526 of the computing device 500 in FIG. 5.

Block 622 may be followed by block 624, "USE REALIZATION OF UNIFORM DISTRIBUTION IN INITIALIZATION OF EEM ALGORITHM ON THE RECEIVED DATA TO PREVENT CONVERGENCE TO A LOCAL MAXIMUM", where the EEM module 526 may initialize the EEM process on the received data. The EEM module 526 may use a realization of uniform distribution to prevent convergence to a local maximum.

Block 624 may be followed by block 626, "USE POSITIVE PERTURBATION SCHEME TO AVOID BOUNDARY OVERFLOW", where the EEM module 526 may employ a positive perturbation scheme to avoid a boundary overflow, and thereby a singularity encounter in the computation.

Block 626 may be followed by block 628, "GENERATE SIGNATURE VECTOR FOR THE ANALYZED DATA", where a signature vector may be generated for the analyzed data. One or more parameters of the GMM of image wavelet subbands may be selected as the signature vector. The selected parameters may be, for example, a mean and a variance of the GMM.

Block 628 may be followed by optional block 630, "USE THE SIGNATURE VECTOR TO DETERMINE UNIQUENESS OR SIMILARITY OF THE ANALYZED DATA TO OTHER DATA", where the EEM module 526 may determine similarity of two sets of image data of uniqueness of a set of image data using their respective signature vectors and a Euclidian distance between the signature vectors.

The blocks included in the above described process are for illustration purposes. Employing an EEM technique in image retrieval and authentication may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

FIG. 7 illustrates a block diagram of an example computer program product, arranged in accordance with at least some embodiments described herein.

In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the EEM module 526 may undertake one or more of the tasks shown in FIG. 7 in response to the instructions 704 conveyed to the processor 504 by the medium 702 to perform actions associated with maintaining application performances upon transfer between cloud servers as described herein. Some of those instructions may include, for example, instructions for using realization of uniform distribution in initialization of EEM algorithm on received data to prevent convergence to a local maximum; using positive perturbation scheme to avoid boundary overflow; generating signature vector for the analyzed data; and using the signature vector to determine uniqueness or similarity of the analyzed data to other data according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disc (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some example embodiments, a method for employing an Enhanced Expectation Maximization (EEM) to determine data uniqueness and similarity may include receiving data to be analyzed; employing a realization of uniform distribution in an initialization of the EEM on the received data to prevent convergence to a local maximum; employing a positive perturbation scheme to avoid boundary overflow: generating a signature vector for the analyzed data; and employing the signature vector to determine one of uniqueness and similarity of the analyzed data to other data based on a similarity of the signature vector to signature vectors of the other data.

According to other examples, the analyzed data may be image data. The method may further include employing a histogram of one dimensional Gaussian Mixture Model (GMM) for the image data, employing two components of the GMM for histogram, applying a multilevel discrete wavelet transform to determine a number of the GMMs to be used, and/or selecting one or more parameters of the GMM of image wavelet subbands as the signature vector. The selected parameters may be a mean and a variance of the GMM. The method may also include determining the uniqueness of the image data based on a Euclidian distance between two signature vectors being greater than a predefined limit or determining the similarity of the image data based on a Euclidian distance between two signature vectors being less than another predefined limit.

According to further examples, a size of the signature vector may be 128 bits or less. The method may also include employing the similarity of the image data for one of image retrieval and indexing and employing the uniqueness of the image data for authentication. The method may yet include generating the signature vector by applying the EEM to color components of the image data. A color space of the image data may include one of HSV, YCrCb, CMYK, and RGB.

According to yet other examples, the positive perturbation scheme may include addition of a denominator factor in goodness calculation of a histogram for the image data. The goodness of the histogram for the image data may be determined by: $G=10 \log_{10}\{ee+A/(ee+MSE)\}$, where $A=\{Max[Max(h_1),Max(h)]\}^2$ with h and $h_1$ being histogram values before and after application of the EEM, $MSE=S(h_1-h)^2/M$ with M being a number of occurrence values in the histogram, and ee is a very small positive perturbation value. The ee may be about $10^{-20}$. And, the method may further include generating the signature vector by applying the EEM to one of video data and audio data.

According to other example embodiments, a computing device for employing an Enhanced Expectation Maximization (EEM) to determine data uniqueness and similarity may include a memory configured to store instructions and a processor coupled to the memory and configured to execute a data processing application in conjunction with the instructions stored in the memory. The data processing application may receive data to be analyzed; employ a realization of uniform distribution in an initialization of the EEM on the received data to prevent convergence to a local maximum; employ a positive perturbation scheme to avoid boundary overflow; generate a signature vector for the analyzed data; and employ the signature vector to determine one of uniqueness and similarity of the analyzed data to other data based on a similarity of the signature vector to signature vectors of the other data.

According to some examples, the analyzed data may be image data. The data processing application may further employ a histogram of one dimensional Gaussian Mixture Model (GMM) for the image data, employ two components of the GMM for histogram, apply a multilevel discrete wavelet transform to determine a number of the GMMs to be used, and/or select one or more parameters of the GMM of image wavelet subbands as the signature vector. The selected parameters may be a mean and a variance of the GMM. The data processing application may determine the uniqueness of the image data based on a Euclidian distance between two signature vectors being greater than a predefined limit or determine the similarity of the image data based on a Euclidian distance between two signature vectors being less than another predefined limit.

According other examples, a size of the signature vector may be 128 bits or less. The data processing application may also employ the similarity of the image data for one of image retrieval and indexing, employ the uniqueness of the image data for authentication, and/or generate the signature vector by applying the EEM to color components of the image data. A color space of the image data may include one of HSV, YCrCb, CMYK, and RGB. The positive perturbation scheme may include addition of a denominator factor in goodness calculation of a histogram for the image data.

According to yet other examples, the goodness of the histogram for the image data may be determined by: $G=10 \log_{10}\{ee+A/(ee+MSE)\}$, where $A=\{Max[Max(h_1),Max(h)]\}^2$ with h and $h_1$ being histogram values before and after application of the EEM, $MSE=S(h_1-h)^2/M$ with M being a number of occurrence values in the histogram, and ee is a very small positive perturbation value. The ee may be about $10^{-20}$. The data processing application may also generate the signature vector by applying the EEM to one of video data and audio data.

According to further example embodiments, a computer-readable storage medium may have instructions stored thereon for employing an Enhanced Expectation Maximization (EEM) to determine data uniqueness and similarity. The instructions may include receiving data to be analyzed; employing a realization of uniform distribution in an initialization of the EEM on the received data to prevent convergence to a local maximum; employing a positive perturbation scheme to avoid boundary overflow; generating a signature vector for the analyzed data: and employing the signature vector to determine one of uniqueness and similarity of the analyzed data to other data based on a similarity of the signature vector to signature vectors of the other data.

According to some examples, the analyzed data may be image data. The instructions may further include employing a histogram of one dimensional Gaussian Mixture Model (GMM) for the image data, employing two components of the GMM for histogram, applying a multilevel discrete wavelet transform to determine a number of the GMMs to be used, and/or selecting one or more parameters of the GMM of image wavelet subbands as the signature vector. The selected parameters may be a mean and a variance of the GMM.

According to other examples, the instructions may also include determining the uniqueness of the image data based on a Euclidian distance between two signature vectors being greater than a predefined limit or determining the similarity of the image data based on a Euclidian distance between two signature vectors being less than another predefined limit. A size of the signature vector may be 128 bits or less. The instructions may further include employing the similarity of the image data for one of image retrieval and indexing, employing the uniqueness of the image data for authentication, and/or generating the signature vector by applying the EEM to color components of the image data. A color space of the image data may include one of HSV, YCrCb, CMYK, and RGB.

According to further examples, the positive perturbation scheme may include addition of a denominator factor in goodness calculation of a histogram for the image data. The goodness of the histogram for the image data may be determined by: $G=10 \log_{10}\{ee+A/(ee+MSE)\}$, where $A=\{Max[Max(h_1),Max(h)]\}^2$ with h and $h_1$ being histogram values before and after application of the EEM, $MSE=S(h_1-h)^2/M$ with M being a number of occurrence values in the histogram, and ee is a very small positive perturbation value. The ee may be about $10^{-20}$. And, the instructions may include generating the signature vector by applying the EEM to one of video data and audio data.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disc (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g. bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for employing an Enhanced Expectation Maximization (EEM) to determine data uniqueness and similarity, the method comprising:
   receiving data to be analyzed;
   employing, a realization of uniform distribution in an initialization of the EEM on the received data to prevent a convergence to a local maximum and to allow another convergence to a global maximum;
   employing a positive perturbation scheme to avoid boundary overflow;
   generating a signature vector for the analyzed data and
   employing the signature vector to determine one of uniqueness and similarity of the analyzed data to other data based on a similarity of the signature vector to signature vectors of the other data.

2. The method according to claim 1, wherein the analyzed data is image data.

3. The method according to claim further comprising employing a histogram of one dimensional Gaussian Mixture Model (GMM) for the image data.

4. The method according to claim 3, further comprising employing two components of the GM M for histogram.

5. The method according to claim 3, further comprising:
   applying a multilevel discrete wavelet transform to determine as number of the GMMs to be used; and
   selecting one or more parameters of the GMM of image wavelet subbands as the signature vector wherein the selected parameters are a mean and a variance of the GMM.

6. The method according to claim 2, further comprising determining the uniqueness of the image data based on a Euclidian distance between two signature vectors being greater than a predefined limit.

7. The method according to claim 2, further comprising determining the similarity of the image data based on a Euclidian distance between two signature vectors being less than another predefined limit.

8. The method according to claim 2, wherein a size of the signature vector is 128 bits or less.

9. The method according to claim 2, further comprising employing the similarity of the image data for one of image retrieval and indexing; and employing the uniqueness of the image data for authentication.

10. The method according to claim 2, further comprising
generating the signature vector by applying the EEM to color components of the image data, wherein a color space of the image data includes one of HSV, YCrCb, CMYK, and RGB.

11. The method according to claim 2, wherein the positive perturbation scheme includes addition of a denominator factor in goodness calculation of a histogram for the image data and the goodness of the histogram for the image data is determined by:

$G=10 \log_{10}\{ee+A/(ee+MSE)\}$, where $A=\{Max[Max(h_1),Max(h)]\}^2$ with h and $h_1$ being histogram values before and after application of the EEM, $MSE=S(h_1-h)^2/M$ with M being a number of occurrence values in the histogram, and ee is a very small positive perturbation value.

12. The method according to claim 11, wherein ee is about $10^{-20}$.

13. The method according to claim 1, further comprising
generating the signature vector by applying the EEM to one of video data and audio data.

14. A computing device for employing an Enhanced Expectation Maximization (EEM) to determine data uniqueness and similarity, the computing device comprising:

a memory configured to store instructions; and a processor coupled to the memory and configured to execute a data processing application in conjunction with the instructions stored in the memory, wherein the data processing application is configured to:

receive data to be analyzed;

employ a realization of uniform distribution in an initialization of the EEM on the received data to prevent convergence to a local maximum and to allow another convergence to a global maximum;

employ a positive perturbation scheme to avoid boundary overflow;

generate a signature vector fir the analyzed data; and employ the signature vector to determine one of uniqueness and similarity of the analyzed data to other data based on a similarity of the signature vector to signature vectors of the other data.

15. The computing device according to claim 14, wherein the analyzed data is image data.

16. The computing device according to claim 15, wherein the data processing application is further configured to
employ a histogram of one dimensional Gaussian Mixture Model (GMM) for the image data.

17. The computing device according to claim 16, wherein the data processing application is further configured to
apply a multilevel discrete wavelet transform to determine a number of the GMMs to be used; and
select one or more parameters of the GMM of image wavelet subbands as the signature vector wherein the selected parameters are a meal and a variance of the GMM.

18. The computing device according to claim 14, wherein the data processing application is further configured to
generate the signature vector by applying the EEM to one of video data and audio data.

19. A non-transitory computer-readable storage medium having instructions stored thereon for employing an Enhanced Expectation Maximization (EEM) to determine data uniqueness and similarity, the instructions comprising;

receiving, data to be analyzed;

employing a realization of uniform distribution in an initialization of the EEM on the received data to prevent a convergence to a local maximum and to allow another convergence to a global maximum;

employing, a positive perturbation scheme to avoid boundary overflow;

generating a signature vector for the analyzed data; and employing the signature vector to determine one of uniqueness and similarity of the analyzed data to other data based on a similarity of the signature vector to signature vectors of the other data.

20. The non-transitory computer-readable storage medium according to claim 19, wherein the analyzed data is image data.

21. The non-transitory computer-readable storage medium according to claim 20, wherein the positive perturbation scheme includes addition of a denominator factor in goodness calculation of a histogram for the image data.

22. The non-transitory computer-readable storage medium according to claim 21, wherein the goodness of the histogram for the image data is determined by:

$G=10 \log_{10}\{ee+A/(ee+MSE)\}$, where $A=\{Max[Max(h_1)Max(h)]\}^2$ with h and $h_1$ being histogram values before and after application of the EEM, $MSE=S(h_1-h)^2/M$ with M being a number of occurrence values in the histogram, and ee is a very small positive perturbation value.

23. The non-transitory computer-readable storage medium according to claim 22, wherein ee is about $10^{-20}$.

* * * * *

UNITED STATES PATENT AND TRADEMARK OFFICE
CERTIFICATE OF CORRECTION

PATENT NO. : 9,158,791 B2
APPLICATION NO. : 14/345211
DATED : October 13, 2015
INVENTOR(S) : Xuan et al.

It is certified that error appears in the above-identified patent and that said Letters Patent is hereby corrected as shown below:

In Column 1, Line 5, delete "RELATE" and insert -- RELATED --, therefor.

In Column 1, Line 9, delete "§371" and insert -- § 371 --, therefor.

In Column 6, Line 9, delete "TABLE 2" and insert -- TABLE 1 --, therefor.

In Column 9, Line 65, delete "block 622." and insert -- block 622, --, therefor.

In Column 11, Line 19, delete "overflow:" and insert -- overflow; --, therefor.

In Column 12, Line 53, delete "analyzed data:" and insert -- analyzed data; --, therefor.

In Column 15, Line 20, delete "(e.g." and insert -- (e.g., --, therefor.

In Column 16, Line 30, in Claim 1, delete "employing," and insert -- employing --, therefor.

In Column 16, Line 36, in Claim 1, delete "data and" and insert -- data; and --, therefor.

In Column 16, Line 43, in Claim 3, delete "claim" and insert -- claim 2, --, therefor.

In Column 16, Line 47, in Claim 4, delete "GM M" and insert -- GMM --, therefor.

In Column 16, Line 50, in Claim 5, delete "as number" and insert -- a number --, therefor.

In Column 17, Line 36, in Claim 14, delete "prevent" and insert -- prevent a --, therefor.

In Column 17, Line 42, in Claim 14, delete "fir the" and insert -- for the --, therefor.

In Column 18, Line 10, in Claim 17, delete "meal" and insert -- mean --, therefor.

Signed and Sealed this
Fifteenth Day of March, 2016

Michelle K. Lee
*Director of the United States Patent and Trademark Office*

CERTIFICATE OF CORRECTION (continued)
U.S. Pat. No. 9,158,791 B2

In Column 18, Line 18, in Claim 19, delete "comprising;" and insert -- comprising: --, therefor.

In Column 18, Line 19, in Claim 19, delete "receiving," and insert -- receiving --, therefor.

In Column 18, Line 24, in Claim 19, delete "employing," and insert -- employing --, therefor.